United States Patent
Persson et al.

(10) Patent No.: US 8,532,192 B2
(45) Date of Patent: Sep. 10, 2013

(54) VIDEO PROCESSING APPARATUS AND A METHOD OF PROCESSING VIDEO DATA

(75) Inventors: Erik Persson, Lund (SE); Tomas Edsö, Lund (SE)

(73) Assignee: ARM Limited, Cambridge (GB)

( * ) Notice: Subject to any disclaimer, the term of this patent is extended or adjusted under 35 U.S.C. 154(b) by 516 days.

(21) Appl. No.: 12/805,149

(22) Filed: Jul. 14, 2010

(65) Prior Publication Data

US 2011/0013699 A1    Jan. 20, 2011

(30) Foreign Application Priority Data

Jul. 16, 2009 (GB) .................................. 0912408.2

(51) Int. Cl.
| | |
|---|---|
| H04N 11/02 | (2006.01) |
| H04N 11/04 | (2006.01) |
| H04N 7/12 | (2006.01) |
| H04N 7/32 | (2006.01) |

(52) U.S. Cl.
USPC ............ 375/240.18; 375/240.01; 375/240.24; 375/240.25; 375/240.26

(58) Field of Classification Search
USPC ........................... 375/240.18, 240.24, 240.25
See application file for complete search history.

(56) References Cited

U.S. PATENT DOCUMENTS

| | | | |
|---|---|---|---|
| 6,278,734 B1 | 8/2001 | Geib et al. | |
| 2005/0265449 A1* | 12/2005 | Yoon ......................... | 375/240.12 |
| 2008/0056364 A1* | 3/2008 | Lyashevsky et al. ..... | 375/240.13 |
| 2009/0284400 A1* | 11/2009 | Gui et al. ......................... | 341/60 |

FOREIGN PATENT DOCUMENTS

| | | |
|---|---|---|
| EP | 1 605 703 | 12/2005 |
| JP | 2003-289544 | 10/2003 |

OTHER PUBLICATIONS

UK Search Report for GB0912408.2, dated Oct. 21, 2009.
Seitner, F.H., "Evaluation of data-parallel slitting approaches for H.264 decoding", MOMM 2008, (Nov. 24-26, 2008), 10 pages.
Altunbasak, Y. et al., "An Analysis of the DCT Coefficient Distribution with the H.264 Video Coder", Center for Signal and Image Processing, Georgia Institute of Technology, 4 pages.
Minegishi, N. et al., "A Multi-Standards HDTV Video Decoder for Blu-Ray Disc Standard", Mitsubishi Electronic Research Laboratories, (Apr. 2008).

\* cited by examiner

*Primary Examiner* — Joseph Ustaris
*Assistant Examiner* — On S Mung
(74) *Attorney, Agent, or Firm* — Nixon & Vanderhye P.C.

(57) ABSTRACT

A video processing apparatus and method are provided, the video processing apparatus comprising first stage video processing circuitry and second stage video processing circuitry. The first stage video processing circuitry receives input video data and performs one or more processing operations on the input video data to generate an intermediate representation of the input video data. The intermediate representation comprises first and second separate data portions, with the first data portion containing transient data derived from the input video data and the second data portion containing long term data derived from the input video data. Transient data is only required for processing of a single video frame, while the long term data is required for processing of at least two video frames. The first stage video processing circuitry is arranged to output the first and second separate data portions for storing in a buffer, and the second stage video processing circuitry then retrieves the first and second data portions from the buffer and performs one or more further processing operations on those data portions in order to generate output video data. The transient data is compressed prior to being stored in the buffer, and then decompressed when retrieved from the buffer by the second stage video processing circuitry. Such an approach enables the operations of the second stage video processing circuitry to be decoupled from the operations of the first stage video processing circuitry, while reducing the storage capacity requirements of the buffer.

15 Claims, 11 Drawing Sheets

BITSTREAM TO BE DECODED

SIGNED EXPONENTIAL GOLOMB ENCODING

| INPUT (SIGNED) | STEP 1: CONVERSION TO UNSIGNED | STEP 2: SIGNED EXPONENTAL GOLOMB ENCODING |
|---|---|---|
| ⋮ | ⋮ | |
| -4 | 8 | 0001001 |
| -3 | 6 | 00111 |
| -2 | 4 | 00101 |
| -1 | 2 | 011 |
| 0 | 0 | 1 |
| 1 | 1 | 010 |
| 2 | 3 | 00100 |
| 3 | 5 | 00110 |
| 4 | 7 | 0001000 |
| ⋮ | ⋮ | |

→ DEFLATE

← INFLATE

VIDEO PROCESSING APPARATUS AND A METHOD OF PROCESSING VIDEO DATA

FIELD OF THE INVENTION

The present invention relates to a video processing apparatus and a method of processing video data.

BACKGROUND OF THE INVENTION

Often video data is transmitted as an encoded bitstream, and accordingly an apparatus receiving that encoded bitstream will need to perform a decoding operation in order to derive the pixel data for each video frame of a video image encoded in that bitstream. As shown schematically in FIG. 1, each frame 10 can be considered to be formed of a series of macroblocks (MBs) 20 arranged in a series of rows and columns. Each macroblock represents a block of adjacent pixels, for example a rectangular 16×16 array of pixels. However, for the purposes of the present application, the term macroblock is not intended to imply any particular size of block, and accordingly larger or smaller arrays of pixels can be represented by each macroblock.

The encoded bitstream will contain a sequence of macroblocks in encoded form, and each of those macroblocks will need to be decoded in order to derive the pixel data for each video frame of a video image. Such a bitstream is illustrated in FIG. 2, where the bitstream 100 comprises a sequence of macroblocks 105, 110, 115, 120, 125, 130 in encoded form. Due to the content represented by each macroblock, macroblocks may be of significantly different sizes, as illustrated schematically in FIG. 2. Further, there will be dependencies between various macroblocks, meaning that the content represented by one macroblock can only be fully decoded once one or more other macroblocks have been decoded. Accordingly, it is known to split the decoding operation into two stages. A first stage is a parsing stage, in which each of the encoded macroblocks in the bitstream are partially decoded in their received sequence in order to remove any bitstream encoding dependencies between the macroblocks. This creates a partially decoded bitstream in an intermediate form which is then input to a second stage of decode referred to as a pipe stage, where individual macroblocks are fully decoded in order to determine the pixel data represented by those macroblocks. Due to the removal of bitstream encoding dependencies, the intermediate form is a representation which can be interpreted without being read in the same macroblock order as the original bitstream. It should be noted however that there are typically still other types of dependencies, such as intra prediction pixel dependencies, which are not removed by the parsing stage.

Once the parsing stage has been performed to generate the intermediate form where any bitstream encoding dependencies between the macroblocks have been removed, the amount of time taken to process each macroblock within the pipe stage, for example to perform inverse transform operations, motion compensation operations, etc, is predictable, i.e. relatively fixed. However, the time taken to parse any particular macroblock can vary very significantly, since the amount of processing required to perform the parsing operation will vary from macroblock to macroblock dependent on the content and hence sizes of those macroblocks. Thus, if the parse stage is to be run in synchronisation with the pipe stage, then the parse circuitry needs to be able to cope in real time with the significant variation in complexity of the parsing operation on a macroblock by macroblock basis, leading to a significant increase in the cost and complexity of the parser circuitry.

Accordingly, as shown in FIG. 3, it is known to provide a buffer to buffer the output from the parser circuitry prior to it being forwarded to the pipe circuitry, in order to allow the activities of the parser circuitry to be decoupled in time from the activities of the pipe circuitry. Thus, as shown in FIG. 3, the parser circuitry 55 receives the encoded bitstream 50 and performs a partial decode operation in order to produce an intermediate form 60 in which any bitstream encoding dependencies between the macroblocks have been removed. A buffer 65 is then provided to buffer the intermediate form for multiple macroblocks. Thereafter the intermediate form for selected macroblocks 70 can be read out to the pipe circuitry 75, where a full decode operation can be performed.

By providing buffering between the parse circuitry and the pipe circuitry, this alleviates the earlier mentioned constraints on the parser circuitry, allowing for a simpler and more cost effective implementation of the parser circuitry. Furthermore, whilst the parsing operation is an inherently serial operation where each macroblock in turn in the bitstream is subjected to the parsing operation, the full decode operation performed by the pipe circuitry need not be performed in such a sequential manner. Indeed, as shown by the schematic illustration 80 in FIG. 3, multiple non-sequential macroblocks can be processed in parallel within the pipe circuitry, the illustration 80 showing a two-row parallel progression where one macroblock in a first row and another macroblock in a second row (the location of that macroblock being staggered with respect to the location of the first macroblock) are processed in parallel. Such row parallel progression gives rise to significant performance benefits, as is understood in the art. In particular, macroblocks can take a variety of different forms, for example I-macroblocks and P-macroblocks. For an I-macroblock, the macroblock immediately to the left needs to have been decoded before it is possible to fully decode the I-macroblock, and hence it would not be possible to decode two adjacent I-macroblocks in a particular row in parallel. Further, for P-macroblocks, the decoding of these macroblocks involves the use of reference frame data when performing motion compensation, and often that reference frame data is locally cached. By processing macroblocks in parallel in the way illustrated by the element 80 in FIG. 3, improved locality within the cache can be achieved (i.e. there is a significant re-use of the cached data for the macroblocks being processed).

The article "Evaluation of Data-Parallel Splitting Approaches for H.264 Decoding" by F Seitner et al, MoMM 2008, Nov. 24-26, 2008, Lintz, Austria, describes a variety of techniques for arranging multiple processing units to perform the pipe stage of a video decode operation on multiple macroblock rows in parallel. However, as discussed in section 5.3, all of the data obtained by parsing the bitstream (i.e. the intermediate form referred to in FIG. 3) must be kept in a buffer until no longer required by the pipe circuitry, and this can lead to buffers of significant size due to the large amount of intermediate data that needs to be retained. In particular, if the buffer is retained internally within the decode engine (i.e. the unit providing the parser circuitry and pipe circuitry), the size of the buffer required is likely to have a significant impact on the area and hence cost of the decoder. If instead the buffer is provided externally to the decode engine, then this can give rise to significant bandwidth issues due to the need to write the intermediate data from the parser circuitry into the buffer and then to read that data from the buffer when subsequently required by the pipe circuitry.

The article "A Multi-Standards HDTV Video Decoder for Blu-Ray Disc Standard" by N Minegishi et al, Mitsubishi Electric Research Laboratories, TR2008-004, April 2008, describes an HDTV video decoder that employs a data compression method to reduce memory data usage and access bandwidth. As described earlier, the decode operation is divided into two parts, namely a parse stage (referred to in the article as the VLC decode section) and a pipe stage (referred to in the article as a pixel operation section), and the intermediate form output from the parse stage is compressed prior to storage in an external buffer. The intermediate form is then later decompressed when retrieved by the pipe stage. The compression technique described is based upon exponential Golomb codes.

Whilst compression of the intermediate form can alleviate the earlier mentioned problems with regard to buffer size and bandwidth requirements, a trade-off needs to be made between the complexity and cost introduced by the compression, and the buffer size/bandwidth reduction resulting from the performance of the compression.

Accordingly, it would be desirable to provide an improved mechanism for decoupling the parsing stage and the pipe stage of a video decoding operation, whilst alleviating the above described disadvantages of the known buffering techniques.

SUMMARY OF THE INVENTION

Viewed from a first aspect, the present invention provides a video processing apparatus comprising: first stage video processing circuitry for receiving input video data and performing one or more processing operations on the input video data to generate an intermediate representation of the input video data; the intermediate representation comprising first and second separate data portions, the first data portion containing transient data derived from the input video data, the transient data only being required for processing of a single video frame, and the second data portion containing long term data derived from the input video data, the long term data being required for processing of at least two video frames; the first stage video processing circuitry being arranged to output the first and second separate data portions for storing in a buffer; second stage video processing circuitry for retrieving the first and second data portions from the buffer and performing one or more further processing operations on the first and second data portions in order to generate output video data; compression circuitry for applying a compression operation to the transient data prior to the first data portion being output to the buffer; and decompression circuitry for applying a decompression operation to the first data portion as retrieved from the buffer in order to obtain the transient data prior to said one or more further processing operations being performed by said second stage video processing circuitry.

Considering the example of a video decoding apparatus, the first stage video processing circuitry may take the form of parsing circuitry for partially decoding a sequence of macroblocks contained within an encoded bitstream forming the input video data, and the second stage video processing circuitry may take the form of pipe circuitry for performing the full decode operation in order to produce pixel data for each video frame of a video image. The inventors of the present invention realised that the intermediate representation produced by the first stage video processing circuitry comprises data of two different types, namely transient data which is only required for processing of a single video frame, and long term data which is required for processing of at least two video frames. In accordance with the present invention, these two types of data are separated so that the intermediate representation contains first and second separate data portions, the first data portion containing the transient data and the second data portion containing the long term data. These first and second separate data portions are then output for storing in a buffer. By separating the data of the intermediate representation in this way, the total amount of data that needs to be stored in the buffer at any point in time is significantly reduced, since the transient data can be deleted as soon as the output video data for a current video frame has been generated by the second stage video processing circuitry. In typical implementations the transient data forms a significant part of the intermediate representation, and hence the buffer space savings achievable from this approach are significant.

Furthermore, the video processing apparatus of the present invention further comprises compression circuitry for applying a compression operation to the transient data prior to the first data portion being output to the buffer, and decompression circuitry for applying a decompression operation to the first data portion as retrieved from the buffer in order to obtain the transient data prior to said one or more further processing operations being performed by said second stage video processing circuitry.

The intermediate representation will generally be decompressed when compared with the input video data, due to the one or more processing operations performed by the first stage video processing circuitry. Having separated the intermediate representation into the first and second separate data portions, with the first data portion containing transient data, the inventors of the present invention realised that the transient data could be readily compressed and later decompressed, to give a significant reduction in the amount of data which needs to be output for storing in the buffer, and with only a relatively small impact on area (due to the presence of the compression and decompression circuitry). In particular, it has been found that the transient data lends itself readily to being compressed significantly via a relatively simple compression operation, thereby enabling a significant decrease in the amount of data to be buffered with relatively little overhead. In particular, the compression and decompression circuitry can be simplified relative to equivalent circuitry used to compress and decompress the entirety of the intermediate representation, since the compression and decompression circuitry of the present invention can be optimised having regards to properties of the transient data, rather than needing to be able to compress all parts of the intermediate representation.

In summary, the present invention achieves reductions in buffer size/bandwidth requirements by a two-fold approach. Firstly, the first stage video processing circuitry produces an intermediate representation where the transient data is separated from the long term data, allowing the transient data to be deleted sooner than would be possible if a unified intermediate representation were used. Secondly, compression circuitry is provided to compress the transient data prior to buffering, such compression circuitry being less complex than the compression circuitry described in the earlier mentioned article "A Multi-Standards HDTV Video decoder for Blu-Ray Disc Standard" since it does not need to be able to handle all of the data of the intermediate representation but can instead be optimised having regard to properties of the transient data. Since the transient data typically form a large proportion of the intermediate representation, the space/bandwidth savings achievable by the above two-fold approach are very significant, without requiring complex compression and decompression circuitry.

Further, the inventors of the present invention realised that the technique of the present invention is not limited solely to use in video decoders. For example, the same basic approach can be used within a video encoder, in which event the first stage video processing circuitry comprises processing circuits for generating from input pixel data an intermediate representation in the form of macroblock data, and the second stage video processing circuitry then comprises encode circuits for producing an encoded bitstream containing a sequence of macroblocks in encoded form.

In one embodiment, the first data portion provides residual data for each macroblock of a video image, the residual data being transient data since it is only required for processing of a single video frame.

In one particular embodiment, the residual data for each macroblock comprises a set of coefficients used in one or more transform operations. For example, when encoding, the residual data is typically subjected to one or more discrete cosine transform (DCT) transforms, and when decoding, the residual data is typically subjected to one or more inverse DCT operations.

In one embodiment, the compression operation performed by the compression circuitry is chosen having regard to predetermined properties of the set of coefficients, with the aim of achieving a good level of compression with relatively little increase in the cost and complexity of the video processing apparatus. In one particular embodiment, a suitable compression operation converts the set of coefficients into a set of Signed Exponential-Golomb codes. In particular, when considering a decode operation, the set of coefficients for each macroblock often contain a significant number of zero values, and it has been found that the use of Signed Exponential-Golomb codes provides a particularly efficient mechanism for compressing a set of coefficients including a significant number of zero values. However, the use of Signed Exponential-Golomb codes is not essential, and any other appropriate coding could be used, for example more general Huffman or arithmetic coding techniques could be used.

The data provided within the second data portion of the intermediate representation can take a variety of forms. However, in one embodiment, the second data portion provides motion vector information for each macroblock of a video image. This motion vector information may comprise the motion vectors themselves, or motion vector offset values that can be combined with predicted motion vectors in order to generate motion vectors from the motion vector offset values.

As mentioned earlier, the actual processing operations performed by the first stage video processing circuitry and second stage video processing circuitry will vary dependent on the function to be achieved by the video processing apparatus. However, in one embodiment, the video processing apparatus is used for decoding input video data in the form of an encoded bitstream containing a sequence of macroblocks in encoded form, wherein: said first stage video processing circuitry comprises parsing circuitry for partially decoding the sequence of macroblocks to remove bitstream encoding dependencies between the macroblocks, such that the first data portion comprises transient data of each macroblock and the second data portion contains long term data of each macroblock; and said second stage video processing circuitry comprises processing circuits to produce pixel data for each video frame of a video image from the first and second data portions retrieved from the buffer.

In such decoding implementations, the separation of the intermediate representation into separate first and second data portions allows a reduction in the storage capacity required by the buffer due to the first data portion being able to be deleted after the current video frame has been processed. The storage capacity requirements of the buffer are further significantly reduced when the transient data of the first data portion is compressed prior to being output to the buffer, as discussed earlier this transient data typically taking the form of a set of coefficients which lend themselves to an efficient compression.

In one embodiment, the second stage video processing circuitry processes in parallel the first and second data portions relating to at least two non-sequential macroblocks. Due to the decoupling of the parsing operation from the remaining decode operation performed by the second stage video processing circuitry, this enables the second stage video processing circuitry to process macroblocks non-sequentially, thereby yielding significant performance improvements in the decoding operation by allowing non-sequential macroblocks to be processed in parallel.

In one embodiment, at least the processing circuits of the second stage video processing circuitry reuse the long term data for macroblocks of a first video frame when producing pixel data for a second video frame. Optionally, this long term data may also be used by the parsing circuitry of the first stage video processing circuitry.

As mentioned previously, the data provided within the second data portion, i.e. the long term data required for processing of at least two video frames, can take a variety of forms. In one embodiment, the parsing circuitry subdivides the second data portion into at least two sub-portions, each sub-portion comprising long term data required for processing of at least two video frames. In particular, each sub-portion will contain different types of long term data. This can be useful in situations when not all of the long term data is required in all of the processing steps, since by splitting the long term data into various sub-portions, this can enable an optimisation in the reading of the data from the buffer.

In one particular embodiment, a first of the at least two sub-portions comprises a stream of de-blocking information. De-blocking information is used to remove edge artefacts between macroblocks, and the de-blocking information is relatively compact, therefore making the de-blocking information a good candidate for storing in a separate sub-portion of the second data portion.

In an alternative embodiment, the video processing apparatus is used to perform an encoding operation rather than a decoding operation. In particular, in such embodiments, the video processing apparatus is used for encoding input video data in the form of pixel data for each video frame of a video image, wherein: said first stage video processing circuitry comprises processing circuits for generating from the pixel data the intermediate representation in the form of macroblock data, such that the first data portion comprises transient data of each macroblock and the second data portion contains long term data of each macroblock; and said second stage video processing circuitry comprises encode circuits for producing, from the first and second data portions retrieved from the buffer, an encoded bitstream containing a sequence of said macroblocks in encoded form.

As with embodiments that perform decoding, by separating the intermediate representation into transient data and long term data, this enables a reduction in the overall storage capacity required in the buffer, due to the transient data of the macroblock being able to be deleted before the corresponding long term data of that macroblock can be deleted. Further space savings in the buffer are achieved when employing compression prior to output of the transient data to the buffer, followed by decompression once that transient data is retrieved by the second stage video processing circuitry.

In one embodiment, the processing circuits of the first stage video processing circuitry process in parallel pixel data from at least two rows of a current video frame, thereby improving the performance of the encoding operation.

Viewed from a second aspect, the present invention provides a method of performing video processing, comprising the steps of: in a first processing stage, performing one or more processing operations on input video data in order to generate an intermediate representation of the input video data; forming the intermediate representation so as to comprise first and second separate data portions, the first data portion containing transient data derived from the input video data, the transient data only being required for processing of a single video frame, and the second data portion containing long term data derived from the input video data, the long term data being required for processing of at least two video frames; outputting the first and second separate data portions for storing in a buffer; in a second processing stage, retrieving the first and second data portions from the buffer and performing one or more further processing operations on the first and second data portions in order to generate output video data; applying a compression operation to the transient data prior to the first data portion being output to the buffer; and applying a decompression operation to the first data portion as retrieved from the buffer in order to obtain the transient data prior to said one or more further processing operations being performed during said second processing stage.

Viewed from a third aspect, the present invention provides a video processing apparatus comprising: first stage video processing means for receiving input video data and performing one or more processing operations on the input video data to generate an intermediate representation of the input video data; the intermediate representation comprising first and second separate data portions, the first data portion containing transient data derived from the input video data, the transient data only being required for processing of a single video frame, and the second data portion containing long term data derived from the input video data, the long term data being required for processing of at least two video frames; the first stage video processing means for outputting the first and second separate data portions for storing in a buffer means; second stage video processing means for retrieving the first and second data portions from the buffer means and for performing one or more further processing operations on the first and second data portions in order to generate output video data; compression means for applying a compression operation to the transient data prior to the first data portion being output to the buffer means; and decompression means for applying a decompression operation to the first data portion as retrieved from the buffer means in order to obtain the transient data prior to said one or more further processing operations being performed by said second stage video processing means.

BRIEF DESCRIPTION OF THE DRAWINGS

The present invention will be described further, by way of example only, with reference to embodiments thereof as illustrated in the accompanying drawings, in which.

DESCRIPTION OF EMBODIMENTS

Figure 4:
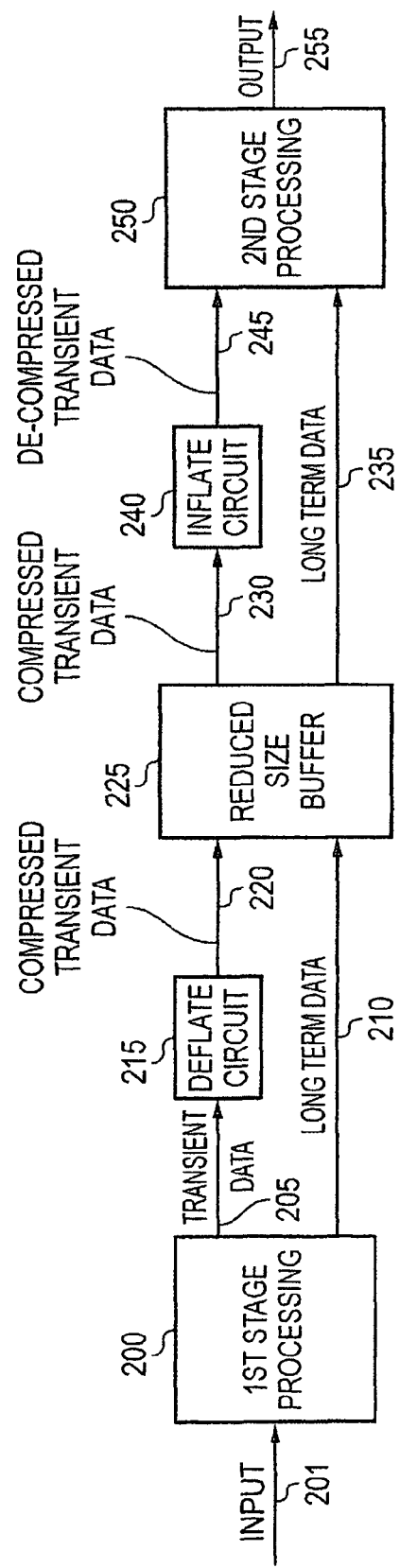
FIG. 4 illustrates a video processing apparatus in accordance with one embodiment.

FIG. 4 is a block diagram illustrating a video processing apparatus in accordance with one embodiment. Input video data is received by the first stage video processing circuitry 200 over path 201. The first stage video processing circuitry then performs one or more processing operations on the input video data in order to generate an intermediate representation of the input video data. In accordance with the illustrated embodiment, this intermediate representation takes the form of two separate data portions, the first data portion containing transient data that is only required for processing a single video frame, the transient data being output over path 205, and the second data portion containing long term data required for processing of at least two video frames, the long term data being output over path 210.

As can be seen from FIG. 4, the long term data is passed to a buffer 225, but the transient data is first passed to a deflate circuit 215, where a compression operation is applied to the transient data in order to provide compressed transient data over path 220 to the buffer 225.

Figure 1:
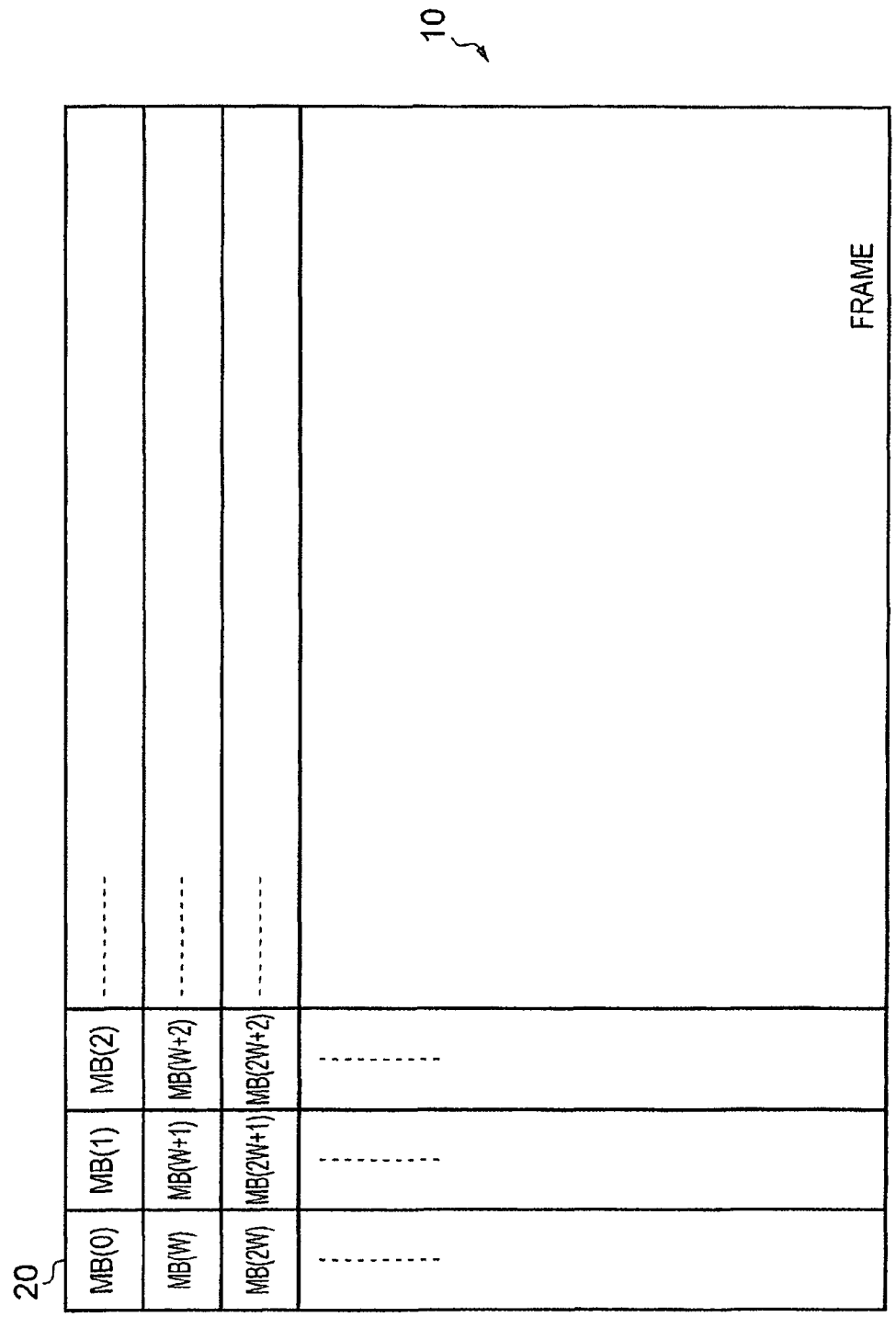
FIG. 1 illustrates how a frame of a video image is broken down into a sequence of macroblocks.
Figure 2:
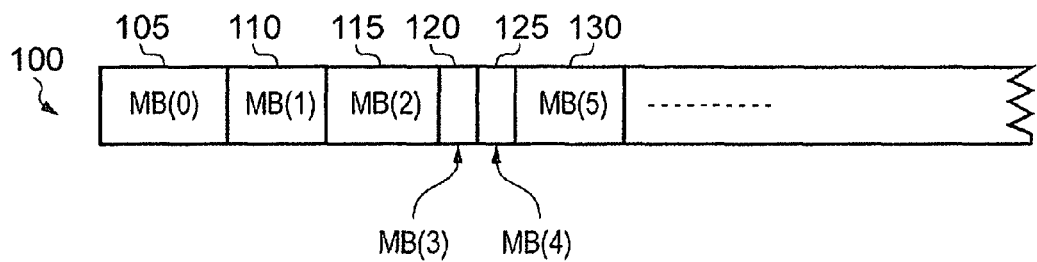
FIG. 2 schematically illustrates a known format of encoded bitstream comprising a sequence of different size encoded macroblocks.
Figure 3:
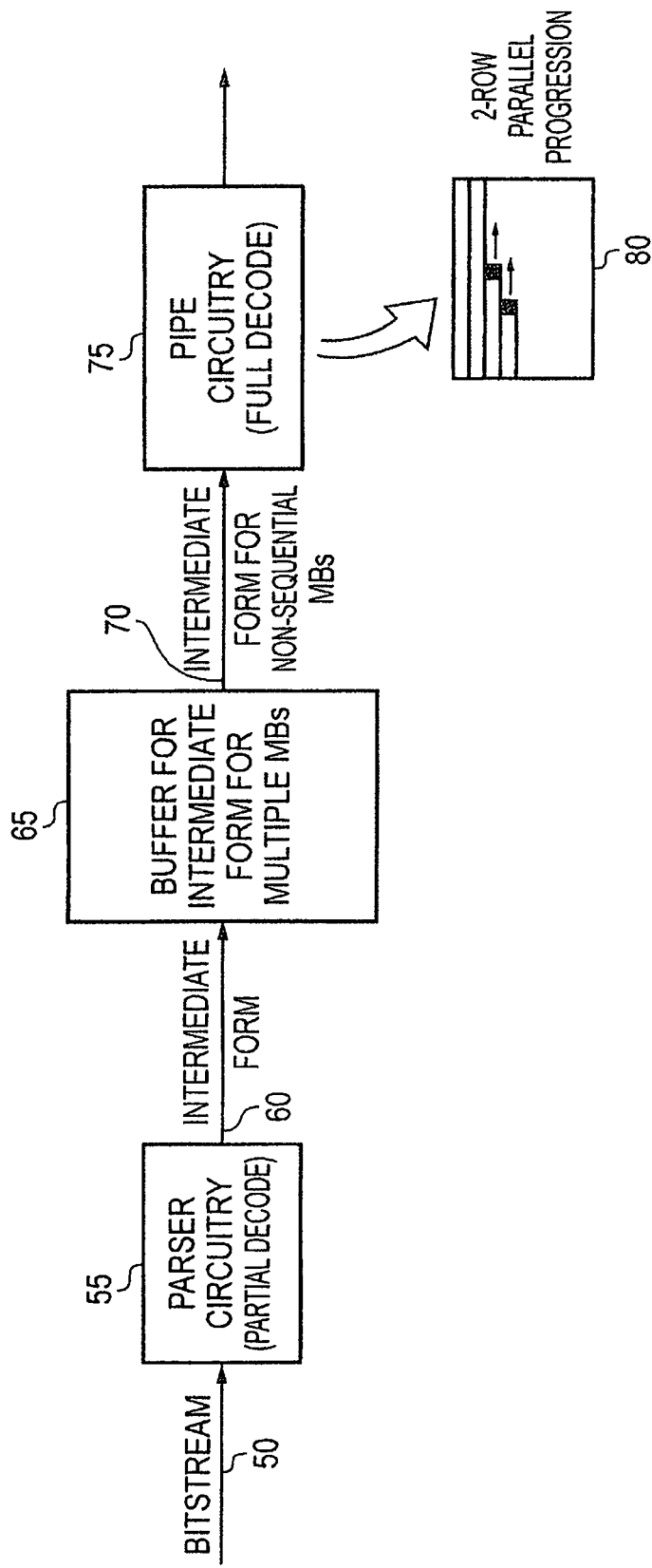
FIG. 3 illustrates a known technique for decoding the bitstream of FIG. 2.

The size of the buffer 225 can be significantly reduced when compared with the buffer 65 of FIG. 3, for two reasons. Firstly, by separating the transient data from the long term data, it is possible to delete the transient data from the buffer 225 as soon as the output video data for a current video frame has been produced by the second stage video processing circuitry 250, since that data will no longer be required by the second stage video processing circuitry. In the prior art approaches, since transient data was not separated from long term data, the transient data for a particular macroblock was retained in the buffer for as long as the long term data of that macroblock was required, but through the above approach of embodiments of the present invention, the amount of data that needs to be retained by the buffer 225 at any point in time is reduced, thereby allowing the size of the buffer to be reduced.

In addition, since the deflate circuit 215 produces a compressed form of transient data, this further enables a reduction in the size of the buffer 225. It has been found that the transient data typically lends itself to a very efficient compression using relatively simple compression techniques, and hence the reductions in cost and complexity obtained by reducing the size of the buffer 225 have been found to significantly outweigh any increase in cost and size resulting from the provision of the deflate circuit 215 and associated inflate circuit 240.

By storing the transient data and long term data for each macroblock in the reduced size buffer 225, the activities of the first stage video processing circuitry 200 can be separated in time from the activities of the second stage video processing circuitry 250. In particular, the second stage video processing circuitry 250 can retrieve the compressed transient data and long term data for selected macroblocks, the selected macroblocks not typically being sequentially located within the input bitstream. Further, the second stage video processing circuitry 250 can be arranged to process the data of multiple macroblocks in parallel, for example using the two-row parallel progression technique discussed earlier.

Any long term data retrieved by the second stage video processing circuitry 250 is passed directly from the buffer to that circuitry over path 235, whilst the corresponding compressed transient data is passed over path 230 to the inflate circuit 240. The inflate circuitry 240 applies a decompression operation to reverse the compression applied by the deflate circuit 215, in order to provide de-compressed transient data over path 245 to the second stage video processing circuitry 250. The second stage video processing circuitry then performs one or more further processing operations on the intermediate representation of each macroblock provided by the corresponding transient data and long term data in order to generate output video data for output over path 255.

Figure 5:
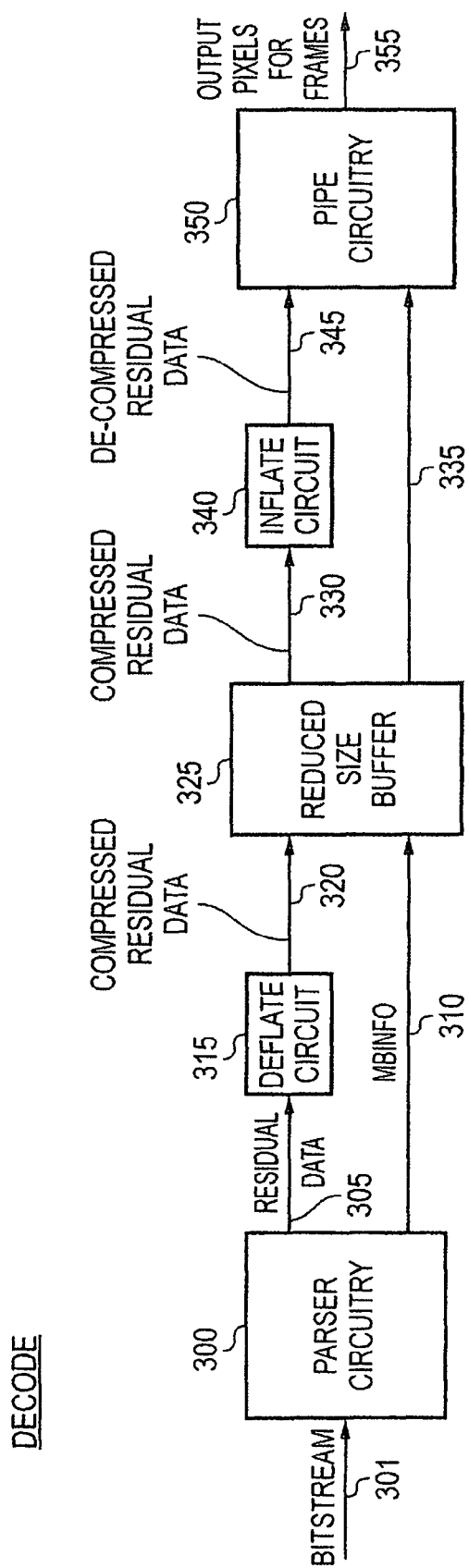
FIG. 5 illustrates a video decoding apparatus in accordance with one embodiment.

The video processing apparatus of FIG. 4 can be used to perform a variety of functions. However, in one embodiment the video processing apparatus is used to perform a video decoding operation, such a video decoding apparatus being illustrated schematically in FIG. 5. In FIG. 5, the components 300, 315, 325, 340 and 350 correspond to the components 200, 215, 225, 240 and 250 in FIG. 4, and accordingly in the decoding apparatus the first stage video processing circuitry takes the form of parser circuitry 300 for receiving an encoded bitstream over path 301, the encoded bitstream containing a sequence of macroblocks in encoded form. The parser circuitry partially decodes the sequence of macroblocks to remove bitstream encoding dependencies between those macroblocks, producing as the transient data residual data output over path 305, and producing as the long term data macroblock information (MB info) data output over path 310. Similarly, the second stage video processing circuitry 250 takes the form of pipe circuitry 350 in the decode embodiment, the pipe circuitry producing pixel data for each video frame of a video image from residual data and MB info data retrieved from the buffer 325 for the macroblocks of each video frame.

Further, the deflate circuit 315 compresses the residual data using a compression operation, whilst the inflate circuit 340 de-compresses the residual data prior to outputting that data to the pipe circuitry 350.

Figures 6A, 6B:
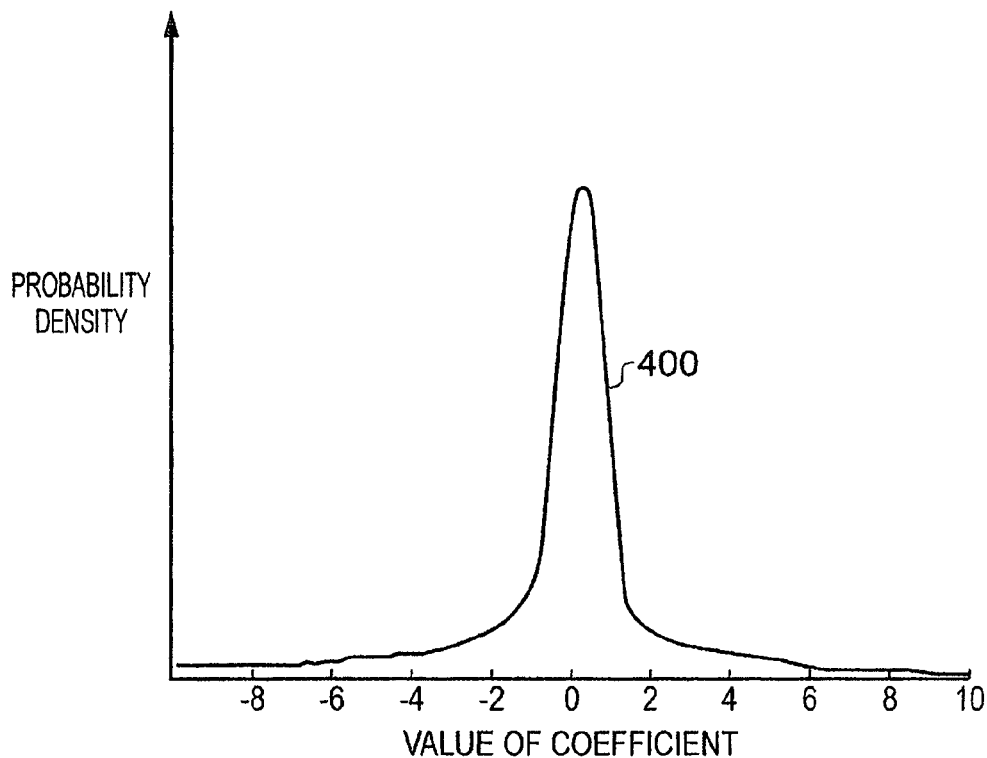
FIG. 6A illustrates the probability density of a set of coefficients for a macroblock provided in residual data produced by the parsing circuitry of a video decoding apparatus.
FIG. 6B schematically illustrates a Signed Exponential-Golomb encoding that may be employed by the deflate circuit of FIG. 5 when performing compression, and reversed by the inflate circuit of FIG. 5 when performing decompression, in accordance with one embodiment.

In one embodiment, the residual data for each macroblock comprises a set of coefficients used in one or more transform operations within the pipe circuitry. In particular, as will be discussed in more detail later, the pipe circuitry 350 performs one or more inverse transform operations during the decoding of the macroblocks in order to generate pixel data. FIG. 6A is a graph schematically illustrating the probability density of the values of the coefficients forming the residual data. As can be seen by the graph 400, a significant number of those coefficients have logic zero values. For a more detailed discussion of coefficient distribution, considering the example of the H.264 video compression standard, the reader is referred to the article "An Analysis of the DCT Coefficient Distribution with the H.264 Video Coder" by Y Altunbasak et al, IEEE Int. Conf. on Acoustics Speech and Signal Processing, Montreal, Canada, May 2004.

As a result of the high number of logic zero values in the residual data, the residual data lends itself to a very efficient compression by the deflate circuit 315. Whilst various coding techniques can be used by the deflate circuit to produce the compressed residual data output over path 320, such as Huffman or arithmetic coding techniques, in one embodiment the compression of the residual data is performed using Signed Exponential-Golomb coding (also referred to herein as SEG coding).

In one particular embodiment, the residual data for a particular macroblock can be considered to consist of 27 sub-blocks, each sub-block containing a sequence of 16 coefficients. In accordance with one embodiment, the deflate circuit 315 is arranged for each sequence of 16 coefficients, to output a single bit indicating where all of the 16 coefficients are zero. If not all of the 16 coefficients are zero, then instead a sequence of 16 SEG codes are output indicating the value of the 16 coefficients. The following syntax illustrates the operation of the deflate circuitry 315, this syntax allowing for raw PCM data to be output if required (for example to support a raw uncompressed mode of operation):

```
deflated_mb           ::= (coeff_mb | pcm_mb)
    coeff_mb          ::= '0' (27 * coeff_block) <align-to-32-bit>
        coeff_block   ::= skipped_block | coded_block
            skipped_block ::= '0'
            coded_block   ::= '1' (16 * signed_golomb)
                signed_golomb ::= (M * '0') '1' (M * ('0' | '1'))
    pcm_mb            ::= (32 * '1') (384 * pcm_byte)
        pcm_byte      ::= 8 * ('0' | '1')
```

Accordingly, it can be seen that when the deflate circuit 315 is performing compression in order to produce a coeff_mb (compressed residual data) for a particular macroblock, then that coeff_mb takes the form of a logic zero value followed by 27 coeff_block values (with the coeff_mb value being aligned to a 32-bit value). Each coeff_block value can either be a skipped_block or a coded_block. A skipped_block is a logic zero value, and is used when the 16 coefficients of a particular sub-block are all zero. Otherwise, the coeff_block takes the form of a coded_block, which is a logic one value followed by 16 SEG codes (signed_golomb codes) to represent each of the 16 coefficients. Each signed_golomb code takes the form of a certain number M of logic zero values, followed by a logic one value, followed by the same number M of logic zero and/or logic one values.

More details of the manner in which SEG codes are generated for different values of coefficient is illustrated schematically in FIG. 6B, in particular FIG. 6B showing the steps taken to generate SEG codes for values from −4 through to +4. As shown in FIG. 6B the compression operation performed by the deflate circuit 315 involves two steps. The first step involves signed to unsigned conversion, as shown in FIG. 6B negative numbers being converted into positive even numbers and positive numbers being converted into positive odd numbers. Thereafter, in a second step, signed exponential-golomb encoding is performed to produce the bit sequences shown in the right hand side of FIG. 6B. The manner in which these sequences are determined is discussed in more detail below.

An exponential-Golomb code (or just Exp-Golomb code) of order k is a type of universal code, parameterized by a whole number k. To encode a non-negative integer in an order-k exp-Golomb code, one can use the following method:
1. Take the number in binary except for the last k digits and add 1 to it (arithmetically).
2. Count the bits, subtract one, and add that number of starting zero bits preceding the previous bit string.
3. Write the last k bits in binary.

For k=0 the code begins:
0=>1=>1
1=>10=>010
2=>11=>011
3=>100=>00100
4=>101=>00101
5=>110=>00110
6=>111=>00111
7=>1000=>0001000
8=>1001=>0001001
...

Exp-Golomb coding for k=0 is used in the H.264/MPEG-4 AVC video compression standard, in which there is also a variation for the coding of signed numbers by assigning the value 0 to the binary codeword '0' and assigning subsequent codewords to input values of increasing magnitude and alternating sign.

Exp-Golomb coding is also used in the Dirac video codec.

The k=0 exp-Golomb code is identical to the Elias gamma code of the same number plus one. Thus it can encode zero, whereas Elias gamma can only encode numbers greater than zero.

Figure 7:
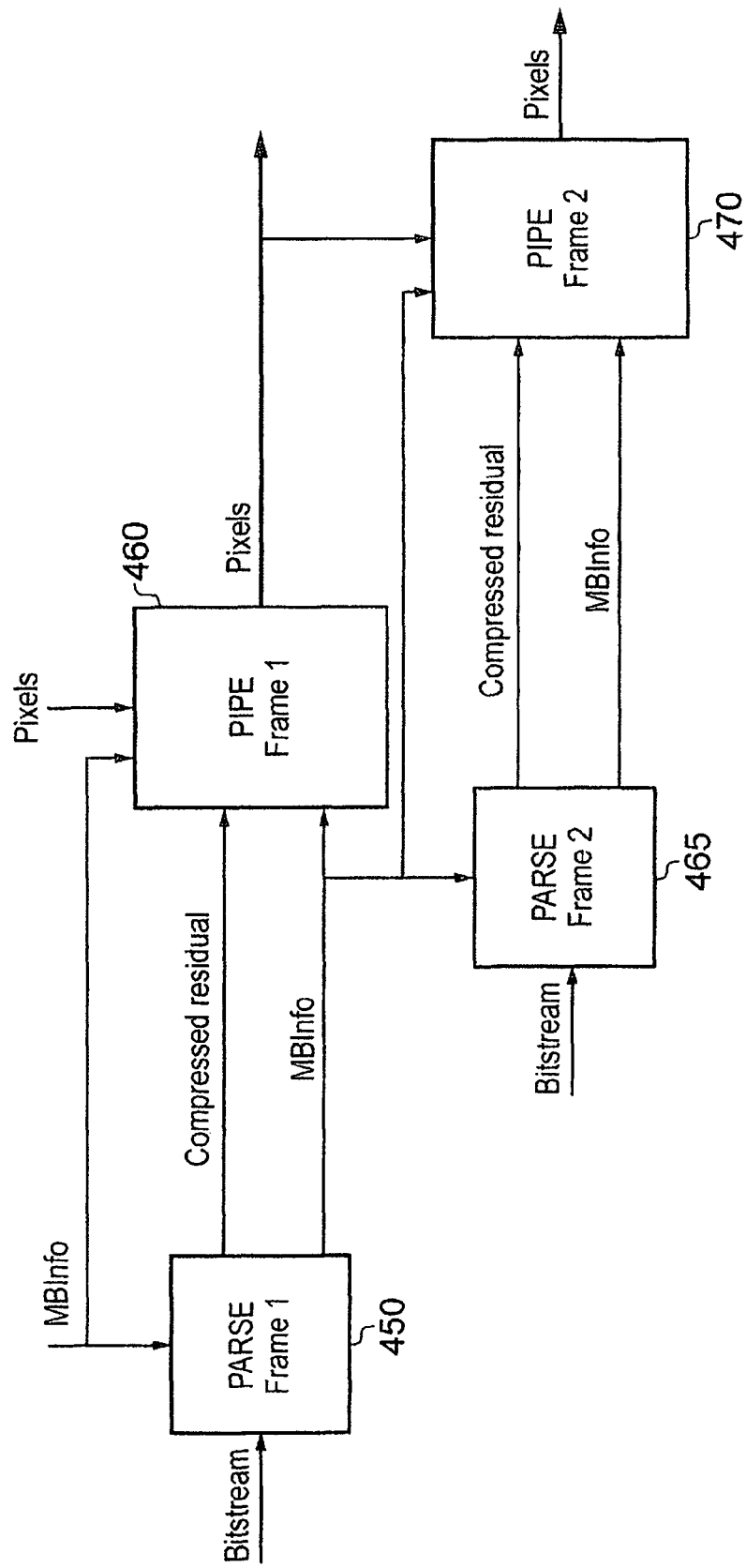
FIG. 7 schematically illustrates how the data produced when processing one frame is re-used when processing a subsequent frame, in accordance with one embodiment.

FIG. 7 is a diagram schematically illustrating how MB info data and pixel data generated when decoding a first frame are used in a subsequent frame. As shown, the parsing operation 450 performed in respect of a first frame takes as its input that part of the encoded bitstream containing the macroblocks of that first frame in encoded form, and also takes as another input MB info determined for various macroblocks of a preceding frame. The compressed residual data produced by the parsing operation 450, along with the MB info data, is routed to the pipe stage operation 460 for frame 1. Although not specifically shown in FIG. 7, it will be appreciated from the earlier description of FIG. 5 that both the compressed residual and the MB info data will have been buffered prior to being provided to the pipe operation 460, and further the compressed residual will have been de-compressed when retrieved from the buffer prior to being input to the pipe operation 460. The pipe operation 460 also receives pixel data from one or more preceding reference frames, as well as MB info from the preceding frame.

As shown in FIG. 7, when performing the parse operation 465 in respect of frame 2, the parsing circuitry receives the MB info determined in respect of frame 1, and also that part of the encoded bitstream representing macroblocks for frame 2. Similarly, the pipe circuitry 470 receives that MB info, along with pixel data in respect of frame 1 (typically from a reference frame buffer (not shown in FIG. 7)), and uses that MB info and pixel data in addition to the residual and MB info data for frame 2 in order to generate the pixel data for frame 2.

Figure 8A:
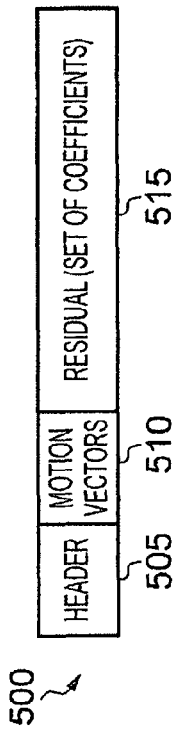
FIG. 8A illustrates the format of a macroblock in accordance with one embodiment.

FIG. 8A schematically illustrates the format of a macroblock 500 as it appears in the input bitstream received by the parser circuitry. The macroblock includes a header portion 505, a motion vector portion 510, and a residual portion 515.

Figure 8B:
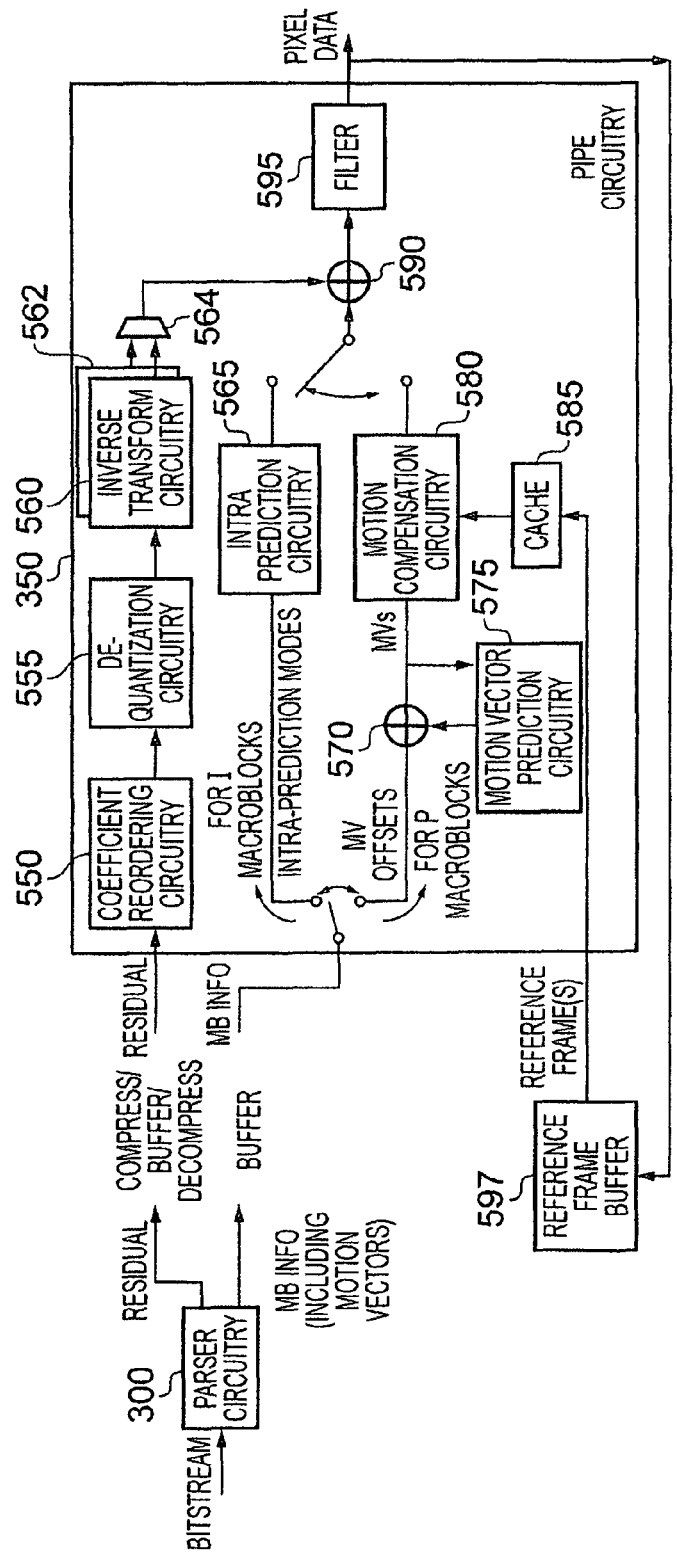
FIG. 8B is a block diagram illustrating in more detail the components provided within the pipe circuitry of FIG. 5 in accordance with one embodiment.

FIG. 8B illustrates in more detail the components provided within the pipe circuitry 350 in accordance with one embodiment. As discussed earlier, the parser circuitry 300 receives an encoded bitstream and partially decodes it in order to generate for each macroblock both residual data and MB info, the MB info including motion vector information. Both of these portions of the intermediate representation generated by the parser circuitry are buffered in the buffer 325 discussed earlier with reference to FIG. 5, but in addition the residual data is compressed prior to buffering, and decompressed when retrieved from the buffer.

The residual data retrieved by the pipe circuitry for a selected macroblock is passed through coefficient re-ordering circuitry 550, prior to being input to de-quantization circuitry 555. Following de-quantization, the residual data is then passed to one of the inverse transform circuits 560, 562. In one embodiment, two inverse transform circuits 560, 562 are provided, to allow parallel processing of the residual data from two selected macroblocks. Since the inverse transform operations performed by the inverse transform circuitry are time intensive, by duplicating this circuitry it is possible to allow for parallel processing of two macroblocks within the pipe circuitry without the necessity to duplicate other parts of the circuitry. However, it will be appreciated that in alternative embodiments one or more of the other components of the pipe circuitry could also be parallelised in order to improve performance. At one extreme, essentially the whole of the pipe circuitry could be parallelised. However in an alternative embodiment, in addition to parallelising the inverse transform circuitry, it would also be possible to provide the motion compensation circuitry 580 in duplicate to allow for parallelising of the motion compensation operations, which are also relatively time intensive.

The multiplexer 564 is provided for selecting between the outputs of the two inverse transform circuits 560, 562 so that the decoded residual data for a particular macroblock can be output to the summation circuitry 590. Here, the residual data is used to modify the output from either the intra prediction circuitry 565 or the motion compensation circuitry 580 dependent on the form of macroblock currently being processed. In particular, I-macroblocks are processed by the intra prediction circuitry 565, and the MB info for an I-macroblock will be routed via a switch to the intra prediction circuitry 565. The MB info for an I-macroblock provides intra prediction mode information which is used by the intra prediction circuitry 565 to determine the basic pixel data for the macroblock, which is then adjusted by the residual data provided to the summation circuitry 590 in order to produce pixel data output to the filter 595. Whilst not specifically shown in FIG. 8B, the intra prediction circuitry 565 will also receive information about pixel data from surrounding macroblocks, but only within the current frame. This pixel data will typically be retained locally to the intra prediction circuitry 565. For example, the intra prediction circuitry might include a RAM which retains the last pixel line being output when processing two macroblock rows, and taken as input to the intraprediction of the next two macroblock rows. Alternatively, this pixel data could be stored in external memory.

For P-macroblocks, the MB info data will be routed via a switch to the summation circuitry 570 which is also coupled to the motion vector prediction circuitry 575. The motion vector prediction circuitry 575 adds a correction to the last motion vector produced by the summation circuitry 570 and outputs that value to the summation circuitry 570 for combining with a motion vector (MV) offset value provided within the MB info. This results in the generation of motion vectors that are input to the motion compensation circuitry 580.

Whilst in the embodiment shown in FIG. 8B, the motion vector prediction circuitry 575 is provided within the pipe circuitry, in an alternative embodiment such a motion vector prediction circuitry 575 could be incorporated within the parser circuitry 300, such that the MB info output by the parser circuitry directly included the motion vectors, rather than motion vector offset information.

The motion compensation circuitry 580 uses the motion vectors received from the summation circuitry 570, along with certain pixel data from one or more reference frames stored in a reference frame buffer 597. In particular the pixel data output by the pipe circuitry for previous frames is stored in the reference frame buffer 597, so that it can subsequently be re-used by other frames. For P-macroblocks, the pixel data from a preceding reference frame is retrieved for access by the motion compensation circuitry 580, typically this reference frame data being cached in a local cache 585. For a P-macroblock, although multiple reference frames will be stored within the reference frame buffer, only one reference frame will be used in respect of a motion compensation operation performed for a particular macroblock. However, when performing two-row parallel progression as discussed earlier, it is found that there is a significant degree of overlap between the reference frame data required for processing a macroblock in a first row and the reference frame data required for processing a trailing macroblock in a second row, the trailing macroblock in the second row being displaced horizontally with respect to the macroblock in the first row. Hence, by using two-row parallel progression techniques, there is a significant improvement in the locality of data in the cache 585, thereby enabling efficient use of the cache 585.

As will be appreciated by those skilled in the art, another type of macroblock is a B-macroblock, which can be considered to be equivalent to a P-macroblock, but in a B-macroblock the motion compensation circuitry will need to reference pixel data from two reference frames rather than just one. In particular, a P-macroblock can be viewed as a macroblock requiring a small correction to a previously decoded frame, whilst a B-macroblock typically uses the average pixel data from two frames that are to be displayed before and after the current frame, and adds a correction to that average.

For B-macroblocks or P-macroblocks, the output from the motion compensation circuitry 580 is routed to the summation circuitry 590, where it is combined with the associated residual data output from the relevant inverse transform circuit 560, 562 via the multiplexer 564, with the resultant pixel data being output to a filter 595.

The filter 595 performs a deblocking operation using pixel data from surrounding macroblocks, but only within the current frame. Typically, this is achieved by retaining such pixel data locally for access by the filter 595. As with the pixel data retained locally for the intra prediction circuitry 565, this pixel data used by the filter 595 can be stored in a RAM accessed by the filter circuitry, or in external memory. The purpose of the deblocking operations performed by the filter circuitry 595 is to remove any edge artefacts between macroblocks so as to produce smooth edges between those macroblocks, resulting in modified pixel data being output where any edge artefacts have been removed. As mentioned earlier, pixel data output from the pipe stage 350 is additionally routed to the reference frame buffer 597 for later reference when processing other video frames.

In one embodiment, the MB info can be sub-divided into at least two sub-portions, each sub-portion comprising long term data required for processing of at least two video frames. In one particular example the de-blocking information within the MB info can be provided within its own sub-portion of the MB info, this enabling more optimised reading of data from the buffer 325.

Figure 9:
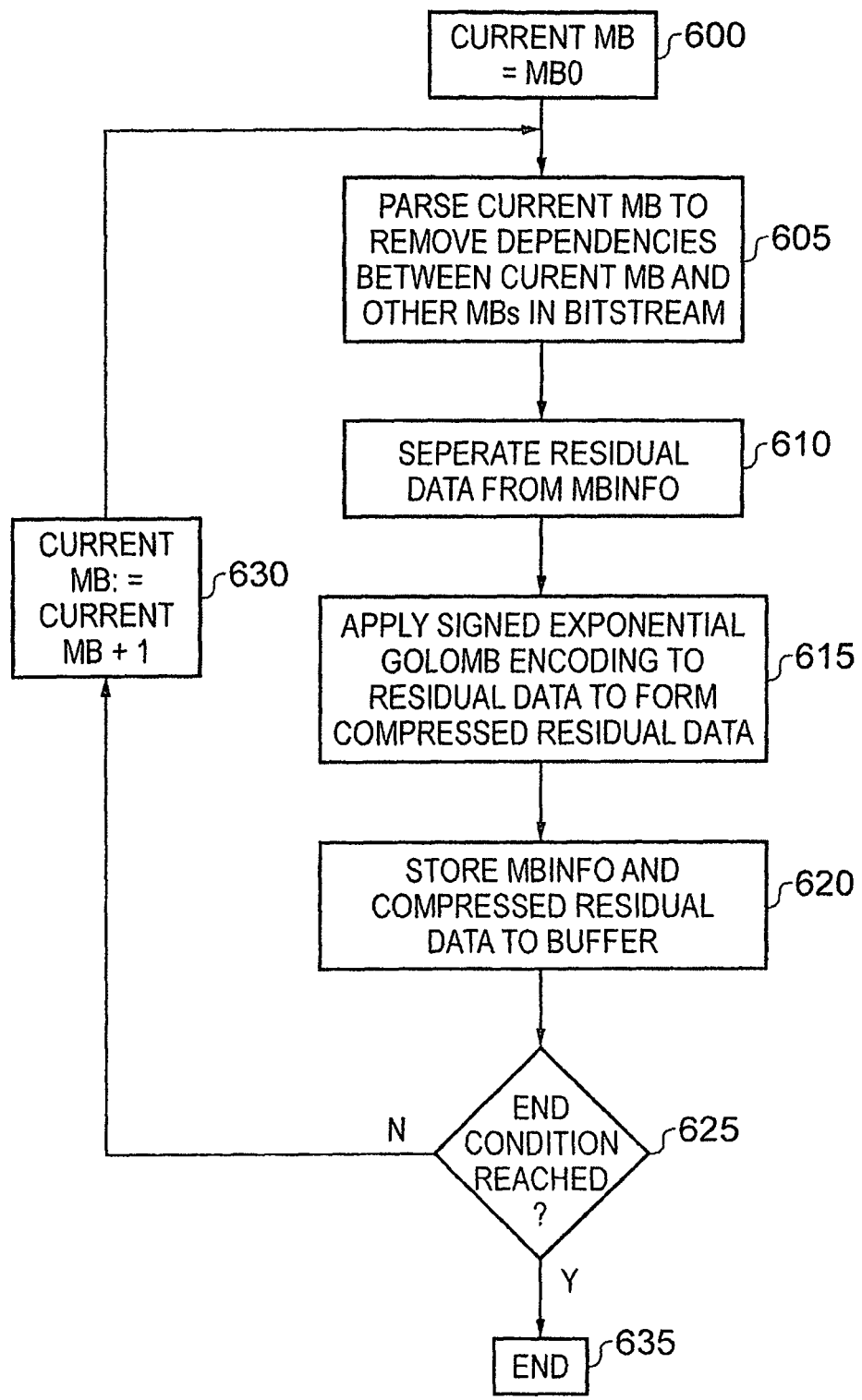
FIG. 9 is a flow diagram illustrating the operation of the parser circuitry of FIG. 5 in accordance with one embodiment.

FIG. 9 is a flow diagram illustrating the operation of the parser circuitry 300 of FIG. 5. At step 600, a current macroblock is set equal to MB0, whereafter the process proceeds to step 605 where the current macroblock is parsed to remove bitstream encoding dependencies between the current macroblock and other macroblocks in the bitstream received by the parser circuitry. During this process, at step 610, the residual data is separated from the MB info. At step 615, signed exponential-golomb encoding is applied to the residual data to form the compressed residual data, in this embodiment the operations of the deflate circuit 315 being considered to be part of the parsing operation.

Thereafter, the MB info and compressed residual data is stored to the buffer 325 at step 620, whereafter at step 625 it is determined whether an end condition has been reached. For example, typically the decoding operation will terminate when the end of a video file has been reached. Often the video decoding apparatus will receive the input bitstream data from a host processor, and when the end of the video file is reached a specific protocol command will be issued from the host processor to the video decoding apparatus to terminate the decode session.

Assuming an end condition has not been reached, then the process branches from step 625 to step 630, where the value of the current macroblock is incremented by one, whereafter the process returns to step 605. Accordingly, it can be seen that each macroblock in turn within the encoded bitstream is processed to produce MB info and compressed residual data for that macroblock, which is then stored in the buffer.

In FIG. 9 the processes are shown as being sequentially applied, with the next macroblock only being processed once the current macroblock has finished being processed. However, it will be appreciated that in an alternative embodiment the operation of the parser circuitry could be pipelined so that several macroblocks could be in the process of being parsed at the same time. Hence, as an example, signed exponential-golomb encoding could be being applied to macroblock 0 whilst the residual data was being separated from the MB info data for macroblock 1, and the encoded form of macroblock 0 was being parsed.

Figure 10:
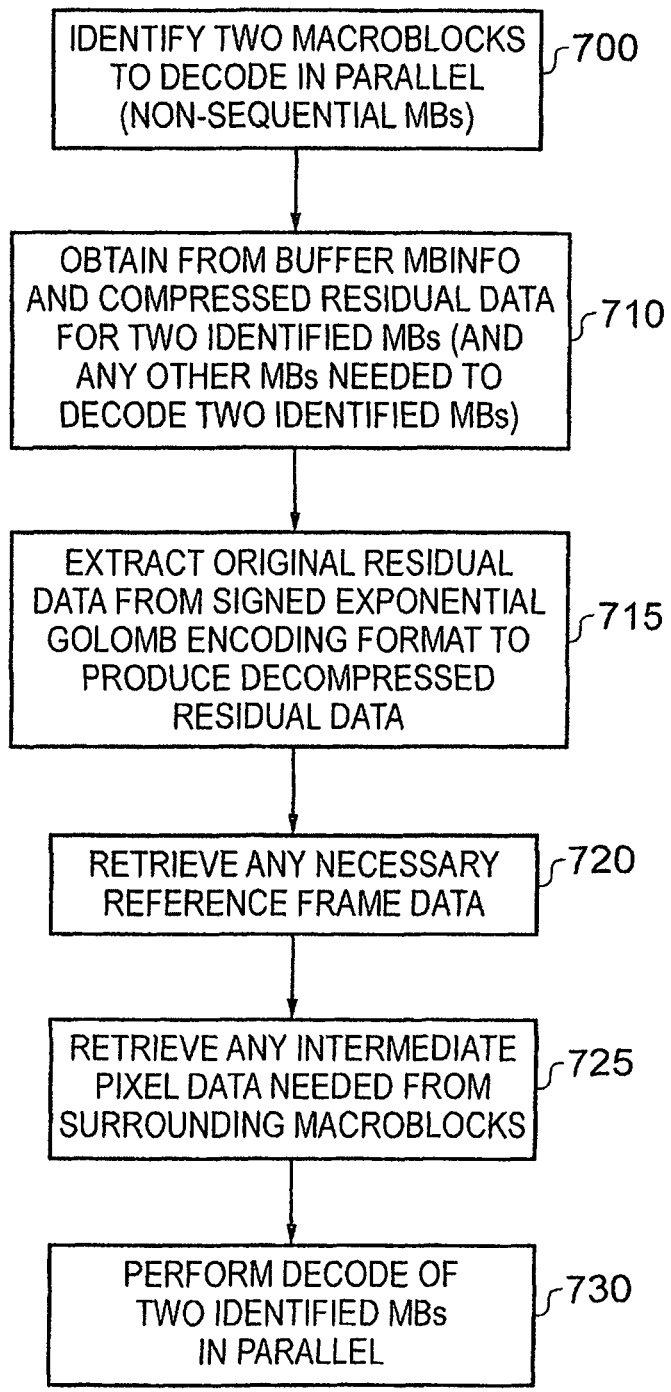
FIG. 10 is a flow diagram illustrating the operation of the pipe circuitry of FIG. 5 in accordance with one embodiment.

FIG. 10 is a flow diagram schematically illustrating the operation of the pipe circuitry 350 of FIG. 5 in accordance with one embodiment. At step 700, the pipe circuitry identifies two macroblocks to decode in parallel, typically these being non-sequential macroblocks, and in one embodiment a two-row parallel progression technique as discussed earlier being employed by the pipe circuitry.

At step 710, MB info and compressed residual data for the identified macroblocks are obtained from the buffer, along with the MB info and compressed residual data for any other macroblocks that need referring to when decoding the two identified macroblocks. In one embodiment the other macroblocks that need referring to are a certain number of surrounding macroblocks that are adjacent to the two identified macroblocks currently being decoded. In some embodiments, the compressed residual data from such surrounding macroblocks is not reused, and only the MBInfo from the surrounding macroblocks is required. In one embodiment, all of this required information is retrieved from the buffer 325 at step 710, but in an alternative embodiment the residual data and MB info data for the required surrounding macroblocks needed to decode the two identified macroblocks may have been buffered locally within the pipe circuitry when previously retrieved from the buffer 325.

At step 715, the inflate circuitry 340 is used to extract the original residual data from the signed exponential-golomb encoding format in order to produce the residual data in decompressed form.

At step 720, any necessary reference frame data is retrieved. In particular, to decode a P-macroblock, it will be necessary to retrieve pixel data from a preceding frame stored in a reference frame buffer, in order for the necessary motion compensation to be performed. Since the pipe, circuitry can process multiple macroblocks in parallel, multiple reference frames may need to be retrieved, but only one reference frame will be used for each macroblock. To decode a B-macroblock, it will be necessary to retrieve macroblocks from two reference frames, typically macroblocks from the frames to be displayed before and after the current frame, as discussed earlier with reference to FIG. 8.

At step 725, any intermediate pixel data needed from surrounding macroblocks is retrieved, as for example may be required by the intra prediction circuitry 565 or filter circuitry 595 discussed earlier with reference to FIG. 8B. Such retrieval may for example take place with respect to RAM structures maintained locally to the intra prediction circuitry 565 or filter circuitry 595.

Following step 725, then decode of the two identified macroblocks is performed in parallel at step 730 through the sequence of operations discussed earlier with reference to FIG. 8B.

Figure 11:
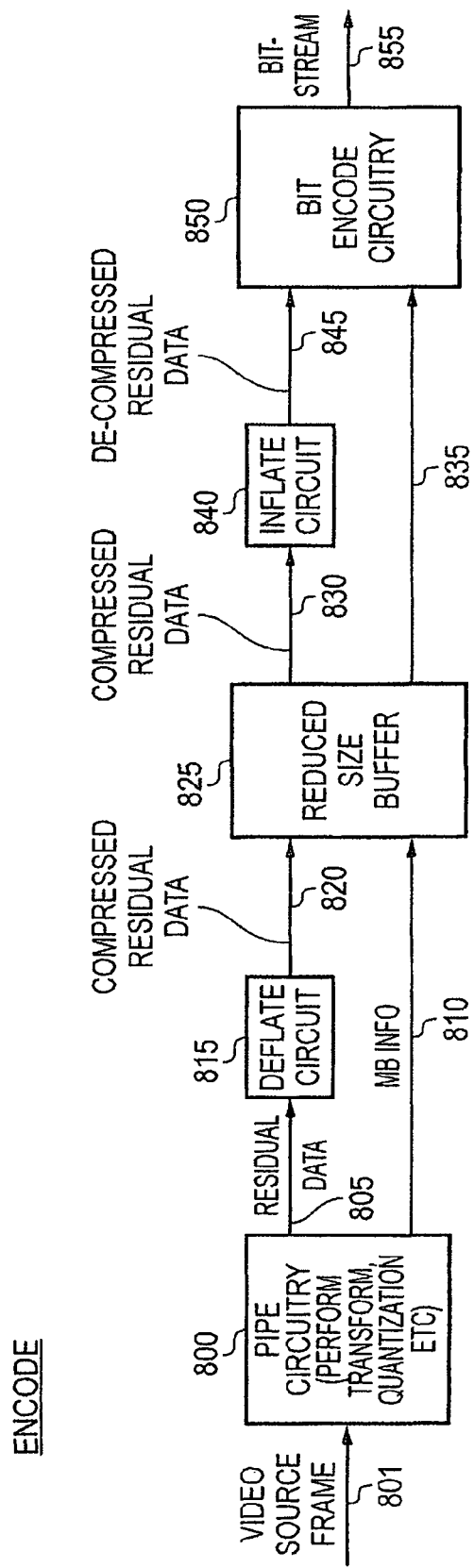
FIG. 11 is a diagram schematically illustrating a video encoding apparatus in accordance with an alternative embodiment.

Whilst embodiments of the present invention have been described in relation to video decode circuitry, the general techniques discussed earlier with reference to FIG. 4 may also be used in association with a video encode circuit, as schematically illustrated in FIG. 11. From the comparison of FIG. 11 with the earlier-described FIG. 4, it will be seen that in the encode embodiment the first stage video processing circuitry takes the form of pipe circuitry 800, that performs transformation, quantization, etc operations for generating from the input pixel data of a video source frame 801 an intermediate representation in the form of macroblock data. As with the decode example, the intermediate representation is separated into two data portions, the first data portion containing residual data output over path 805 and the second data portion containing MB info data output over path 810. The deflate circuit 815, reduced size buffer 825 and inflate circuit 840 operate in an identical manner to that discussed earlier with reference to the elements 215, 225 and 240 of FIG. 4. The second stage video processing circuitry 250 in the encode example now takes the form of bit encode circuitry 850 which produces, from the residual data and MB info data retrieved from the buffer 825, an encoded bitstream containing a sequence of macroblocks in encoded form, the encoded bitstream being output over path 855.

In accordance with the above described embodiments, a significant reduction in the size of buffer required to decouple first stage video processing circuitry from second stage video processing circuitry is achievable. Firstly, by separating the transient data from the long term data, it is possible for the transient data to be deleted as soon as it is no longer required, (i.e. once a current frame has been processed). Further, the transient data is efficiently compressed prior to storing in the buffer and then decompressed prior to provision to the second stage video processing circuitry, giving further reductions in the size of buffer required.

Although a particular embodiment has been described herein, it will be appreciated that the invention is not limited thereto and that many modifications and additions thereto may be made within the scope of the invention. For example, various combinations of the features of the following dependent claims could be made with the features of the independent claims without departing from the scope of the present invention.

We claim:

1. A video processing apparatus comprising:
    first stage video processing circuitry for receiving input video data and performing one or more processing operations on the input video data to generate an intermediate representation of the input video data;
    the intermediate representation comprising first and second separate data portions, the first data portion containing transient data derived from the input video data, the transient data only being required for processing of a single video frame, and the second data portion containing long term data derived from the input video data, the long term data being required for processing of at least two video frames;
    the first stage video processing circuitry being arranged to output the first and second separate data portions for storing in a buffer;
    second stage video processing circuitry for retrieving the first and second data portions from the buffer and performing one or more further processing operations on the first and second data portions in order to generate output video data;
    compression circuitry for applying a compression operation to the transient data prior to the first data portion being output to the buffer; and
    decompression circuitry for applying a decompression operation to the first data portion as retrieved from the buffer in order to obtain the transient data prior to said one or more further processing operations being performed by said second stage video processing circuitry.

2. A video processing apparatus as claimed in claim 1, wherein the first data portion provides residual data for each macroblock of a video image.

3. A video processing apparatus as claimed in claim 2, wherein the residual data for each macroblock comprises a set of coefficients used in one or more transform operations.

4. A video processing apparatus as claimed in claim 3, wherein the compression operation is chosen having regard to predetermined properties of said set of coefficients.

5. A video processing apparatus as claimed in claim 4, wherein said compression operation converts the set of coefficients into a set of Signed Exponential-Golomb codes.

6. A video processing apparatus as claimed in claim 1, wherein the second data portion provides motion vector information for each macroblock of a video image.

7. A video processing apparatus as claimed in claim 1, used for decoding input video data in the form of an encoded bitstream containing a sequence of macroblocks in encoded form, wherein:

said first stage video processing circuitry comprises parsing circuitry for partially decoding the sequence of macroblocks to remove bitstream encoding dependencies between the macroblocks, such that the first data portion comprises transient data of each macroblock and the second data portion contains long term data of each macroblock; and said second stage video processing circuitry comprises processing circuits to produce pixel data for each video frame of a video image from the first and second data portions retrieved from the buffer.

8. A video processing apparatus as claimed in claim 7, wherein said second stage video processing circuitry processes in parallel the first and second data portions relating to at least two non-sequential macroblocks.

9. A video processing apparatus as claimed in claim 7, wherein at least the processing circuits of the second stage video processing circuitry reuse the long term data for macroblocks of a first video frame when producing pixel data for a second video frame.

10. A video processing apparatus as claimed in claim 7, wherein the parsing circuitry subdivides the second data portion into at least two sub-portions, each sub-portion comprising long term data required for processing of at least two video frames.

11. A video processing apparatus as claimed in claim 10, wherein a first of said at least two sub-portions comprises a stream of de-blocking information.

12. A video processing apparatus as claimed in claim 1, used for encoding input video data in the form of pixel data for each video frame of a video image, wherein:

said first stage video processing circuitry comprises processing circuits for generating from the pixel data the intermediate representation in the form of macroblock data, such that the first data portion comprises transient data of each macroblock and the second data portion contains long term data of each macroblock; and said second stage video processing circuitry comprises encode circuits for producing, from the first and second data portions retrieved from the buffer, an encoded bitstream containing a sequence of said macroblocks in encoded form.

13. A video processing apparatus as claimed in claim 12, wherein the processing circuits of said first stage video processing circuitry process in parallel pixel data from at least two rows of a current video frame.

14. A method of performing video processing, comprising the steps of:

in a first processing stage, performing one or more processing operations on input video data in order to generate an intermediate representation of the input video data;

forming the intermediate representation so as to comprise first and second separate data portions, the first data portion containing transient data derived from the input video data, the transient data only being required for processing of a single video frame, and the second data portion containing long term data derived from the input video data, the long term data being required for processing of at least two video frames;

outputting the first and second separate data portions for storing in a buffer;

in a second processing stage, retrieving the first and second data portions from the buffer and performing one or more further processing operations on the first and second data portions in order to generate output video data;

applying a compression operation to the transient data prior to the first data portion being output to the buffer; and applying a decompression operation to the first data portion as retrieved from the buffer in order to obtain the transient data prior to said one or more further processing operations being performed during said second processing stage.

15. A video processing apparatus comprising:

first stage video processing means for receiving input video data and performing one or more processing operations on the input video data to generate an intermediate representation of the input video data;

the intermediate representation comprising first and second separate data portions, the first data portion containing transient data derived from the input video data, the transient data only being required for processing of a single video frame, and the second data portion containing long term data derived from the input video data, the long term data being required for processing of at least two video frames;

the first stage video processing means for outputting the first and second separate data portions for storing in a buffer means;

second stage video processing means for retrieving the first and second data portions from the buffer means and for performing one or more further processing operations on the first and second data portions in order to generate output video data;

compression means for applying a compression operation to the transient data prior to the first data portion being output to the buffer means; and decompression means for applying a decompression operation to the first data portion as retrieved from the buffer means in order to obtain the transient data prior to said one or more further processing operations being performed by said second stage video processing means.

* * * * *